United States Patent
Ushiyama (10) Patent No.: US 7,519,926 B2
(45) Date of Patent: Apr. 14, 2009

(54) SEMICONDUCTOR DEVICE AND METHOD FOR DESIGNING THE SAME

(75) Inventor: Kenichi Ushiyama, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 398 days.

(21) Appl. No.: 11/175,200

(22) Filed: Jul. 7, 2005

(65) Prior Publication Data

US 2006/0236137 A1 Oct. 19, 2006

(30) Foreign Application Priority Data

Mar. 28, 2005 (JP) .............................. 2005-090529

(51) Int. Cl.
*G06F 17/50* (2006.01)

(52) U.S. Cl. ...................... 716/1; 716/2; 716/7; 716/10

(58) Field of Classification Search ................. 716/1–2, 716/4–7, 9–11
See application file for complete search history.

(56) References Cited

U.S. PATENT DOCUMENTS

2006/0117285 A1* 6/2006 Kosugi et al. .................. 716/6

FOREIGN PATENT DOCUMENTS

EP 0 689 290 12/1995

OTHER PUBLICATIONS

Patent Abstracts of Japan, Publication No. 08-008706, Published Jan. 12, 1996.

* cited by examiner

*Primary Examiner*—Paul Dinh
(74) *Attorney, Agent, or Firm*—Staas & Halsey LLP (57) ABSTRACT

Disclosed is a method for designing a semiconductor device so as to prevent the device from being broken even when memory circuits are reset. This method is executed using a computer as follows. First, the computer groups the memory circuits arranged on the basis of arrangement information. Then, the computer inserts a delay circuit between reset lines such that the reset timing of the memory circuits is different in each group. Therefore, the reset timing is different in each group. As a result, a large current flowing during reset is controlled to suppress AC noise so that the semiconductor device can be prevented from being broken.

15 Claims, 7 Drawing Sheets

| FF NAME | MAXIMUM CURRENT VALUE | CURRENT CHANGE TIME |
|---|---|---|
| FF1 | Iff1 | tff1 |
| FF2 | Iff2 | tff2 |
| FF3 | Iff3 | tff3 |
| ⋮ | ⋮ | ⋮ |
| FFn | Iffn | tffn |

SEMICONDUCTOR DEVICE AND METHOD FOR DESIGNING THE SAME

CROSS-REFERENCE TO RELATED APPLICATIONS

This application is based upon and claims the benefits of priority from the prior Japanese Patent Application No. 2005-090529, filed on Mar. 28, 2005, the entire contents of which are incorporated herein by reference.

BACKGROUND OF THE INVENTION

1. Field of the Invention

The present invention relates to a method for designing a semiconductor device. More particularly, the present invention relates to a method for designing a semiconductor device using a computer, in which a semiconductor device is designed so as to control a power supply variation due to reset. The invention also pertains to a semiconductor device designed by this method.

2. Description of the Related Art

A memory circuit such as a flip-flop has a function of keeping data. Therefore, in a semiconductor device such as an LSI (Large Scale Integration) having the memory circuit, the circuit must be first set to an initial state before starting an operation or a test.

The semiconductor device has a terminal and a reset line. The terminal resets the memory circuit on a semiconductor chip. The reset line is connected from the terminal to a reset terminal of each memory circuit. In this device, when a reset signal is sent from the terminal, the memory circuit can be initialized. A design method of this semiconductor device in which the memory circuit can be reset is performed using a computer as follows.

Figure 7:
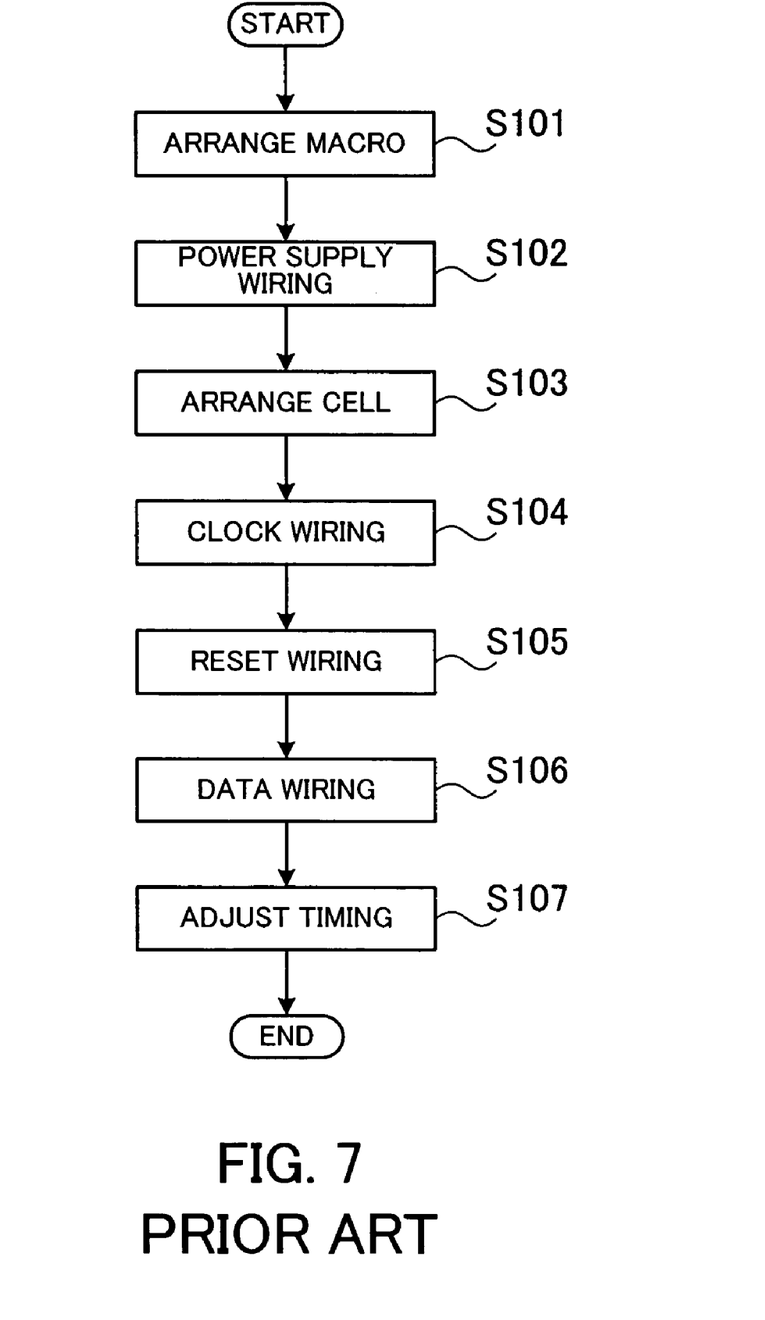
FIG. 7 is a flow chart showing a conventional method for designing a semiconductor device.

FIG. 7 is a flow chart showing a conventional method for designing a semiconductor device.

In step S101, the computer arranges macros such as an SRAM (Static Random Access Memory), a RAM (Random Access Memory) or a PLL (Phase Locked Loop) on a semiconductor chip on the basis of inputted arrangement information.

In step S102, the computer wires power wires on the semiconductor chip on the basis of inputted wiring information.

In step S103, the computer arranges cells on the semiconductor chip on the basis of inputted arrangement information. The cells are, for example, a logic circuit such as an AND circuit, an OR circuit or a flip-flop (a memory circuit) comprising these circuits.

In step S104, the computer wires clock lines on the basis of inputted wiring information. The clock line provides the cell with a clock, for example, for operating the cell in synchronization therewith.

In step S105, the computer wires reset lines for all the memory circuits to be reset.

In step S106, the computer wires data lines on the basis of inputted wiring information.

In step S107, the computer adjusts the timing so that the semiconductor device can properly operate. For example, the computer inserts buffers between wirings so that an operation timing of each circuit can be adjusted.

Further, there is disclosed a semiconductor integrated circuit in which a peak current during reset is controlled so that noise appearing on the power supply voltage and the ground voltage can be reduced and generation of the latch-up phenomenon can be prevented (see, e.g., Japanese Unexamined Patent Publication No. Hei 08-008706).

However, in the conventional method for designing a semiconductor device, all the memory circuits to be reset are simultaneously reset. Therefore, this design method has a problem that when resetting all the memory circuits simultaneously, a large current flows to cause large AC (Alternating Current) noise in a power supply and as a result, the semiconductor devices may be broken.

SUMMARY OF THE INVENTION

In view of the foregoing, it is an object of the present invention to provide a method for designing a semiconductor device so as to prevent the semiconductor device from being broken even when the memory circuits are reset, and to provide a semiconductor device designed by this method.

To accomplish the above objects, according to one aspect of the present invention, there is provided a method for designing a semiconductor device so as to control a power supply variation due to reset.

This design method comprises the steps of: grouping arranged memory circuits by the use of a computer; and inserting by the use of the computer a delay circuit between reset lines such that reset timing of the memory circuits is different in each group of the grouped memory circuits.

According to another aspect of the present invention, there is provided a semiconductor device that controls a power supply variation due to reset.

This device comprises: a grouped memory circuit, and a delay circuit inserted between reset lines such that reset timing of the memory circuits is different in each group of the grouped memory circuits, wherein: the number of the grouped memory circuits is determined such that noise caused by a group reset current which flows when the grouped memory circuits are simultaneously reset can fall in a maximum rating.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The principles of the present invention will be described in detail below with reference to the accompanying drawings.

Figure 1:
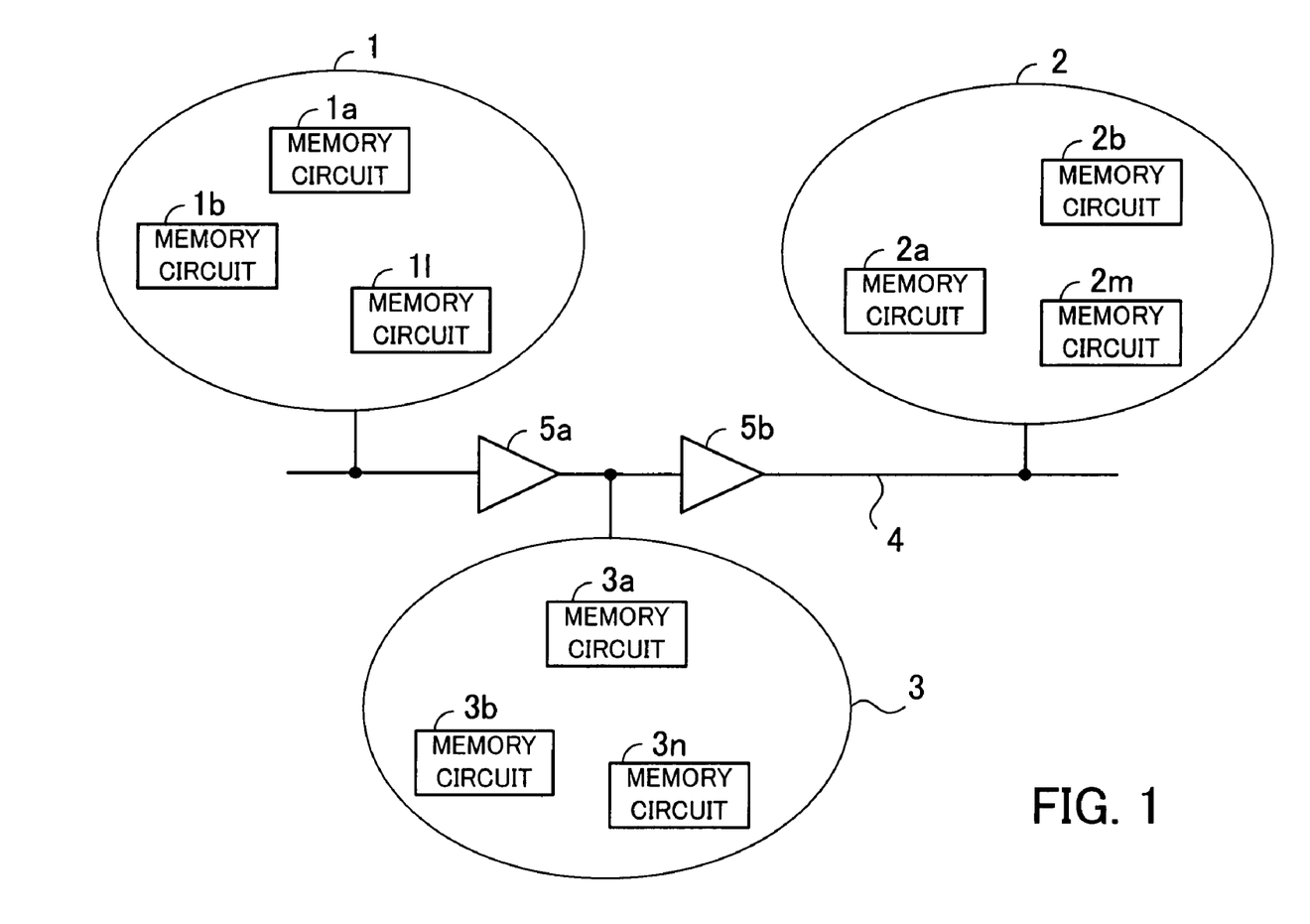
FIG. 1 shows a semiconductor device for illustrating an outline of a semiconductor device design method.

FIG. 1 shows a semiconductor device for illustrating an outline of a method for designing a semiconductor device. It is assumed that as shown in the figure, an operator arranges memory circuits 1a to 1l, 2a to 2m and 3a to 3n on a semiconductor chip by the use of a computer. The figure shows reset lines 4 where a reset signal propagates and delay circuits 5a and 5b which are, for example, buffers inserted between the reset lines 4.

The computer groups the arranged memory circuits 1a to 11, 2a to 2m and 3a to 3n into groups 1 to 3. Furthermore, the computer inserts the delay circuits 5a and 5b between the reset lines 4 such that the reset timing of the memory circuits 1a to 11, 2a to 2m and 3a to 3n is different in each of the groups 1 to 3. For example, the computer inserts the delay circuit 5a between the group 1 and the group 3, and inserts the delay circuit 5b between the group 3 and the group 2. As a result, the reset timing in each of the groups 1 to 3 is different.

As described above, this design method comprises the following steps. First, the computer groups the memory circuits 1a to 11, 2a to 2m and 3a to 3n into groups 1 to 3. Then, the computer inserts the delay circuits 5a and 5b between the reset lines 4 such that the reset timing of the memory circuits 1a to 11, 2a to 2m and 3a to 3n is different in each of the groups 1 to 3. As a result, a large current flowing during reset is controlled to suppress AC noise so that the semiconductor device can be prevented from being broken.

Next, embodiments of the present invention will be described in detail with reference to the accompanying drawings, wherein like reference numerals refer to like elements throughout.

Figure 2:
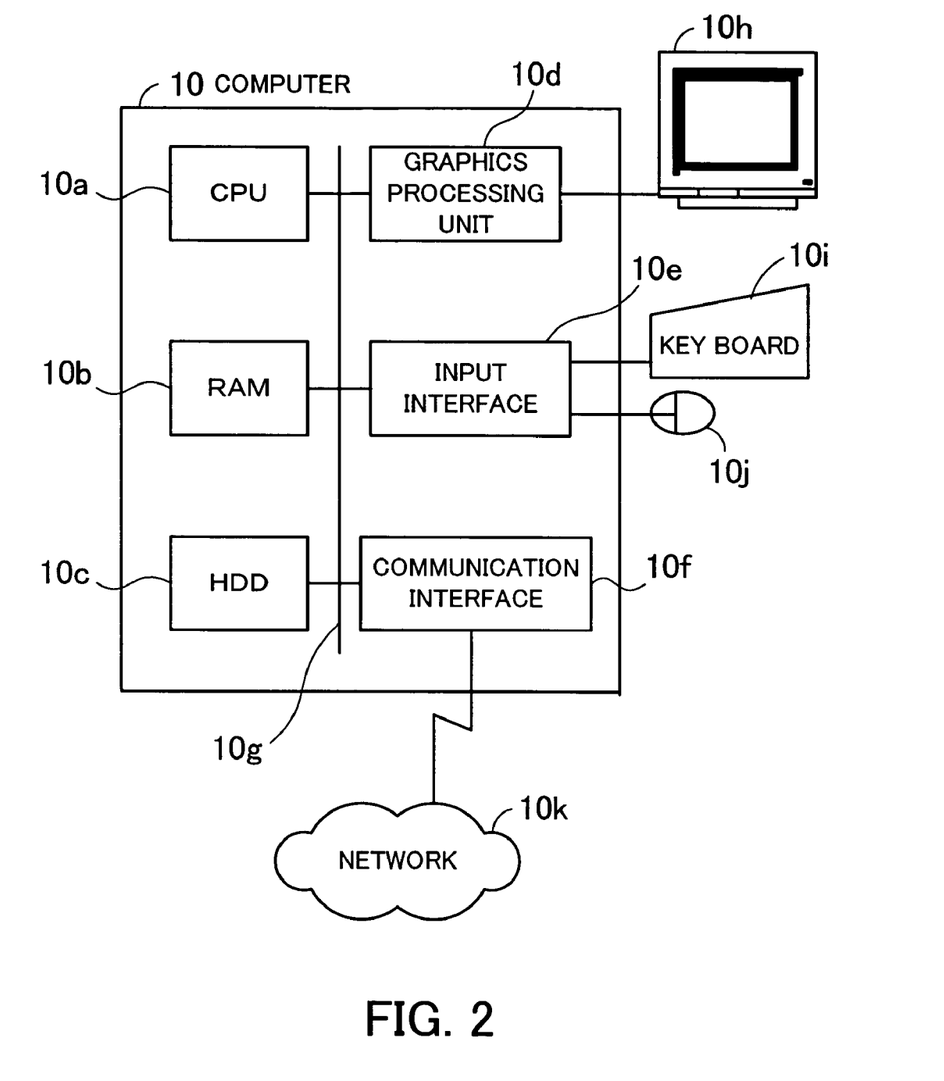
FIG. 2 shows a hardware configuration example of a computer used for designing a semiconductor device.

FIG. 2 shows a hardware configuration example of a computer used for designing the semiconductor device. The whole of a computer 10 is controlled by a CPU (Central Processing Unit) 10a. A RAM 10b, a Hard Disk Drive (HDD) 10c, a graphics processing unit 10d, an input interface 10e and a communication interface 10f are connected to the CPU 10a via a bus 10g.

The RAM 10b temporarily stores at least part of an OS (Operating System) program executed by the CPU 10a or an application program for designing the semiconductor device. The RAM 10b also stores various pieces of data necessary for processing by the CPU 10a. The HDD 10c stores the OS or application program.

A monitor 10h is connected to the graphics processing unit 10d. The graphics processing unit 10d causes the monitor 10h to display images on its screen, in compliance with an instruction from the CPU 10a. A key board 10i and a mouse 10j are connected to the input interface 10e. The input interface 10e sends a signal sent from the keyboard 10i or the mouse 10j to the CPU 10a via the bus 10g.

The communication interface 10f is connected to another computer (not shown). The communication interface 10f sends data to or receives data from another computer via a network 10k such as a LAN.

By the use of the computer 10 having the hardware configuration as described above, semiconductor devices can be designed.

Figure 3:
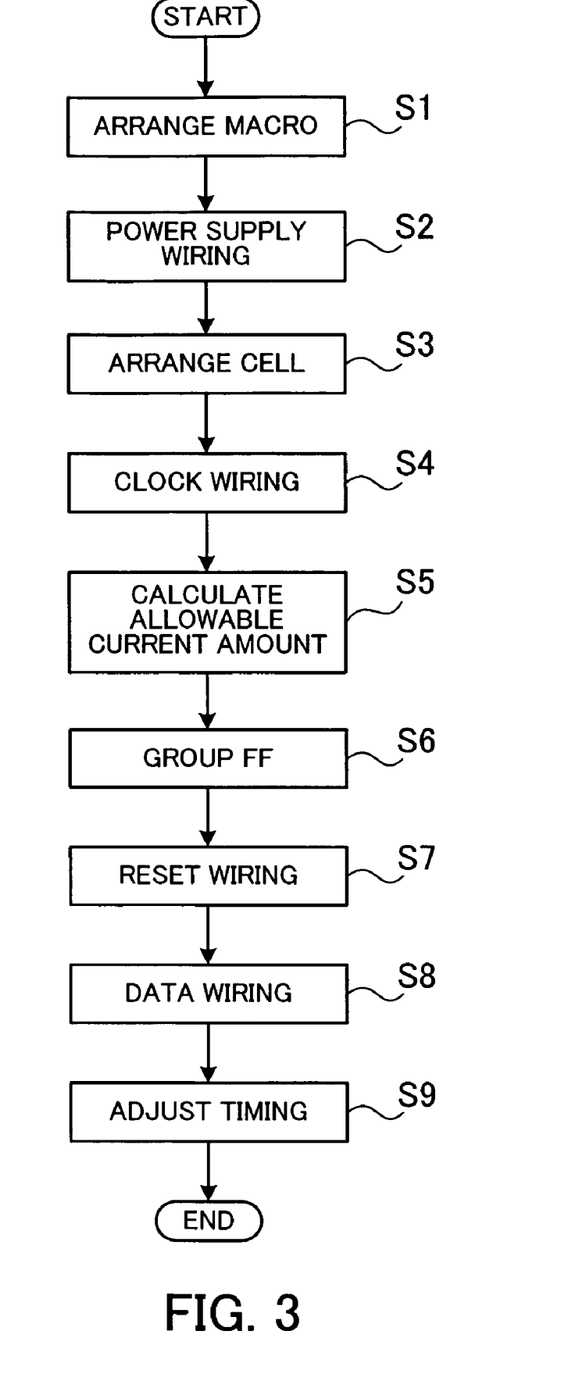
FIG. 3 is a flow chart showing an outline of a method for designing a semiconductor device.

Next, an outline of the method for designing a semiconductor device using the computer 10 will be described with reference to a flow chart. FIG. 3 is a flow chart showing an outline of the method for designing a semiconductor device.

In step S1, the computer 10 arranges macros such as an SRAM, a RAM and a PLL on a semiconductor chip on the basis of inputted arrangement information.

In step S2, the computer 10 wires power wires on the semiconductor chip on the basis of inputted wiring information.

In step S3, the computer 10 arranges cells on the semiconductor chip on the basis of inputted arrangement information. The cells are, for example, a logic circuit such as an AND circuit, an OR circuit or a flip-flop (a memory circuit) comprising these circuits.

In step S4, the computer 10 wires clock lines on the basis of inputted wiring information. The clock line provides the cells with a clock, for example, for operating the cells in synchronization therewith.

In step S5, the computer 10 calculates a maximum current value which may flow through a plurality of flip-flops during reset of the semiconductor device. More specifically, the computer 10 calculates the maximum current value for preventing the semiconductor chip from being broken by AC noise caused due to a current which flows through the flip-flops during reset.

Concretely, on the basis of power supply layout data within a layout data database, the computer 10 calculates the maximum current value for preventing the semiconductor chip from being broken. A power supply wiring in a form of a mesh is spread over the semiconductor chip. The wiring has an inductor component and a resistance component. When assuming that the inductor component of the power supply wiring is expressed as L, the resistance thereof is expressed as R and the current flowing therethrough is expressed as i, AC noise V is expressed as $V=L \times (di/dt)+Ri$. The computer 10 calculates the maximum current value (hereinafter referred to as an allowable current value) which may flow through a plurality of the flip-flops such that the AC noise V can fall in the maximum rating.

In step S6, the computer 10 groups the flip-flops, which are first reset before starting an operation or a test. At this time, the computer 10 groups the flip-flops such that a total sum of the maximum current values flowing during reset of the flip-flops within the group is an allowable current value or less.

In step S7, the computer 10 wires the reset lines for all the flip-flops. At this time, the computer 10 arranges buffers as delay circuits between the reset lines so that each group of the grouped flip-flops is reset at the timing different from each other. For example, the computer 10 inserts the buffers between reset lines connected to each group as shown in FIG. 1. Therefore, the reset timing of each group is different.

In step S8, the computer 10 wires data lines on the basis of inputted wiring information.

In step S9, the computer 10 adjusts the timing so that the semiconductor chip may properly operate. For example, the computer 10 inserts buffers between wirings so that the operation timing of each circuit can be adjusted.

Figure 4:
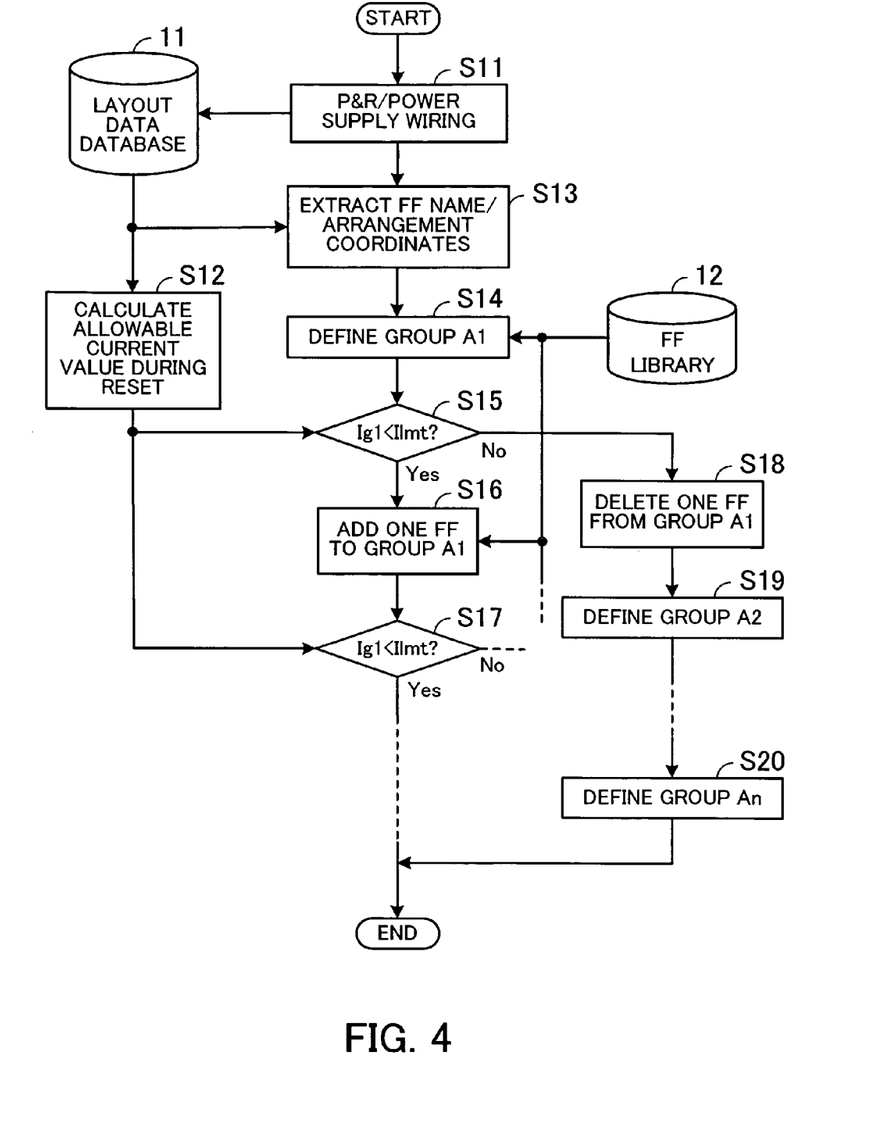
FIG. 4 is a flow chart showing details of a method for designing a semiconductor device.

Next, details of the method for designing a semiconductor device using the computer 10 will be described with reference to a flow chart. FIG. 4 is a flow chart showing details of the method for designing a semiconductor device.

In step S11, the computer 10 executes P & R (Place & Routing) and a power supply wiring. The computer 10 stores, in a layout data database 11, the layout data such as macros, cells and power supply wirings arranged by the P & R and the power supply wiring. The layout data database 11 is constructed, for example, in the HDD 10c shown in FIG. 2. In addition, the processing of step S11 corresponds to those of steps S1 to S4 in FIG. 3. The processings of steps S12 to S20 correspond to those of steps S5 and S6 in FIG. 3.

In step S12, the computer 10 calculates an allowable current value Ilmt on the basis of the power supply layout data stored in the layout data database 11, in the same manner as in the description of step S5 in FIG. 3.

In step S13, the computer 10 extracts all of the flip-flop (FF) names and arrangement coordinates from the layout data database 11. The flip-flop name is given when the flip-flop is arranged in the P & R of step S11.

In step S14, the computer 10 defines a group A1. More specifically, the computer 10 determines the flip-flops to be grouped, on the basis of the flip-flop names and arrangement coordinates extracted in step S13. For example, the computer 10 obtains the extreme left-upper (assuming that the semiconductor chip has a quadrangular shape) flip-flop name (which is referred to as FF1) on the semiconductor chip and the flip-flop name (which is referred to as FF2) on the right side of the FF1. Based on this information, the computer 10 defines the group A1 comprising these flip-flops. Further, with reference to the after-mentioned FF library 12, the computer 10 obtains the maximum current values Iff1 and Iff2 flowing during reset of the FF1 and the FF2. Based on this information, the computer 10 adds the maximum current values Iff1 and Iff2 to calculate a group current value Ig1 of the group A1. That is, the computer 10 calculates the maximum current value flowing during reset of the group A1 comprising the FF1 and the FF2.

Figure 5:
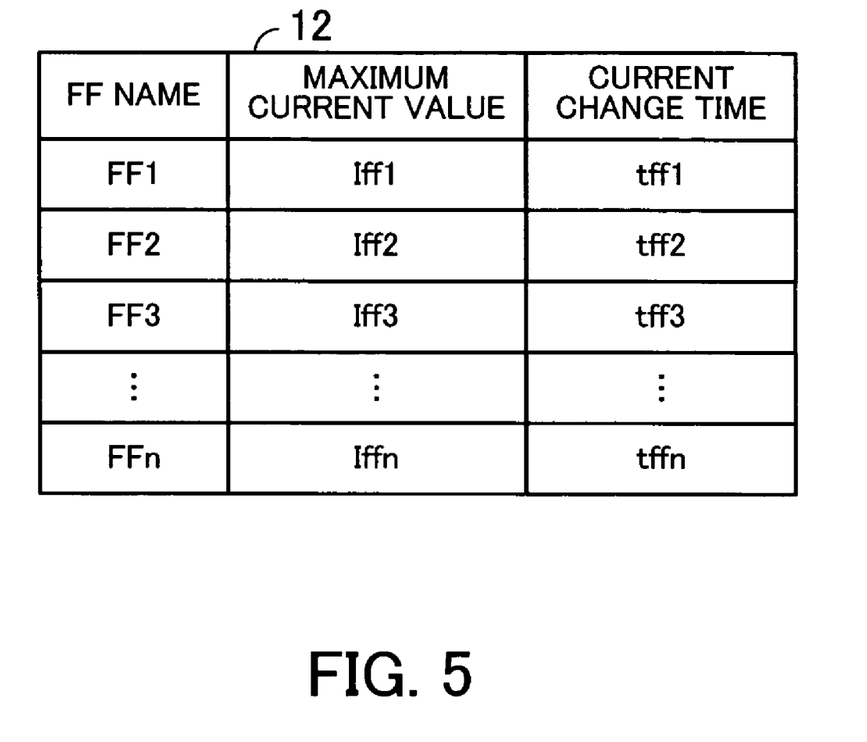
FIG. 5 shows a data configuration example of FF library.

The FF library 12 is now be described.

FIG. 5 shows a data configuration example of the FF library. As shown in the figure, the FF library 12 has an FF name column in which a flip-flop name is stored, a column of the maximum current value which flows through the flip-flip during reset and a column of the current change time of a current which flows through the flip-flop during reset.

The FF library 12 previously registers the FF name, maximum current value and current change time of the flip-flop used during design. With reference to the FF library 12, the computer 10 verifies such information that in the flip-flop named FF1, the maximum current value which flows during reset is Iff1 and the current change time is tff1.

Returning now to FIG. 4, in step S15, the computer 10 compares the allowable current value Ilmt calculated in step S12 with the group current value Ig1 of the group A1 calculated in step S14. When the group current value Ig1 is smaller than the allowable current value Ilmt, the computer 10 proceeds to step S16. When the allowable current value Ilmt is larger than or equal to the group current value Ig1, the computer 10 proceeds to step S18.

In step S16, the computer 10 adds a new flip-flop to the group A1 and calculates the group current value Ig1 of the group A1 where the new flip-flop is added. For example, the computer 10 adds to the group A1 a flip-flop on the right side of the flip-flop named FF2 extracted in step S14. The computer 10 obtains the flip-flop name (which is referred to as FF3) of the added flip-flop. With reference to the FF library 12, the computer 10 obtains the maximum current value Iff3 of the flip-flop named FF3. Furthermore, the computer 10 adds the maximum current values Iff1 to Iff3 of the flip-flops named FF1 to FF3 to calculate the group current value Ig1 of the group A1.

In step S17, the computer 10 compares the allowable current value Ilmt calculated in step S12 with the group current value Ig1 of the group A1 calculated in step S16. When the group current value Ig1 is smaller than the allowable current value Ilmt, the computer 10 proceeds to the processing of adding a new flip-flop to the group A1 and calculating the group current value Ig1 in the same manner as in step S16. When the group current value Ig1 is larger than or equal to the allowable current value Ilmt, the computer 10 proceeds to step S18. Subsequently, the computer 10, when the group current value Ig1 is smaller than the allowable current value Ilmt, repeats the processing of adding a flip-flop to the group A1 and executing the comparison. When the group current value Ig1 is larger than or equal to the allowable current value Ilmt, the computer 10 proceeds to step S18. Finally, when adding all the flip-flops to the group A1, the computer 10 completes the processings.

In step S18, the computer 10, when the group current value Ig1 exceeds the allowable current value Ilmt by the addition of a flip-flop to the group A1, deletes the flip-flop finally added to the group A1. As a result, the group A1 is determined in which the group current value Ig1 does not exceed the allowable current value Ilmt. When executing a processing of step S18 after a branching processing of step S15, the computer 10 deletes the flip-flop named FF2. Therefore, the group A1 comprises only one flip-flop named FF1.

In step S19, the computer 10 defines a group A2 on the basis of the flip-flop deleted from the group A1. That is, the computer 10 defines that the flip-flop named FF2 belongs to the group A2. The computer 10 calculates a group current value Ig2 of the group A2.

Further, the computer 10 compares the allowable current value Ilmt calculated in step S12 with the group current value Ig2 of the group A2 calculated in step S19. When the group current value Ig2 is smaller than the allowable current value Ilmt, the computer 10 repeats the processing of adding a flip-flop to the group A2 and executing the comparison in the same manner as described in steps S16 and S17. When the group current value Ig2 is larger than or equal to the allowable current value Ilmt, the computer 10 executes the processing of deleting the finally added flip-flop from the group A2 and defines a new group A3 in the same manner as described in steps S18 and S19.

In step S20, the computer 10 repeats the above-described processings. When completing the grouping of all the flip-flops, the computer 10 completes the processings.

When completing the processing of the grouping in FIG. 4, the computer 10 executes a processing of inserting buffers between the reset lines such that the reset timing is different in each group as described in FIG. 3.

Figure 6:
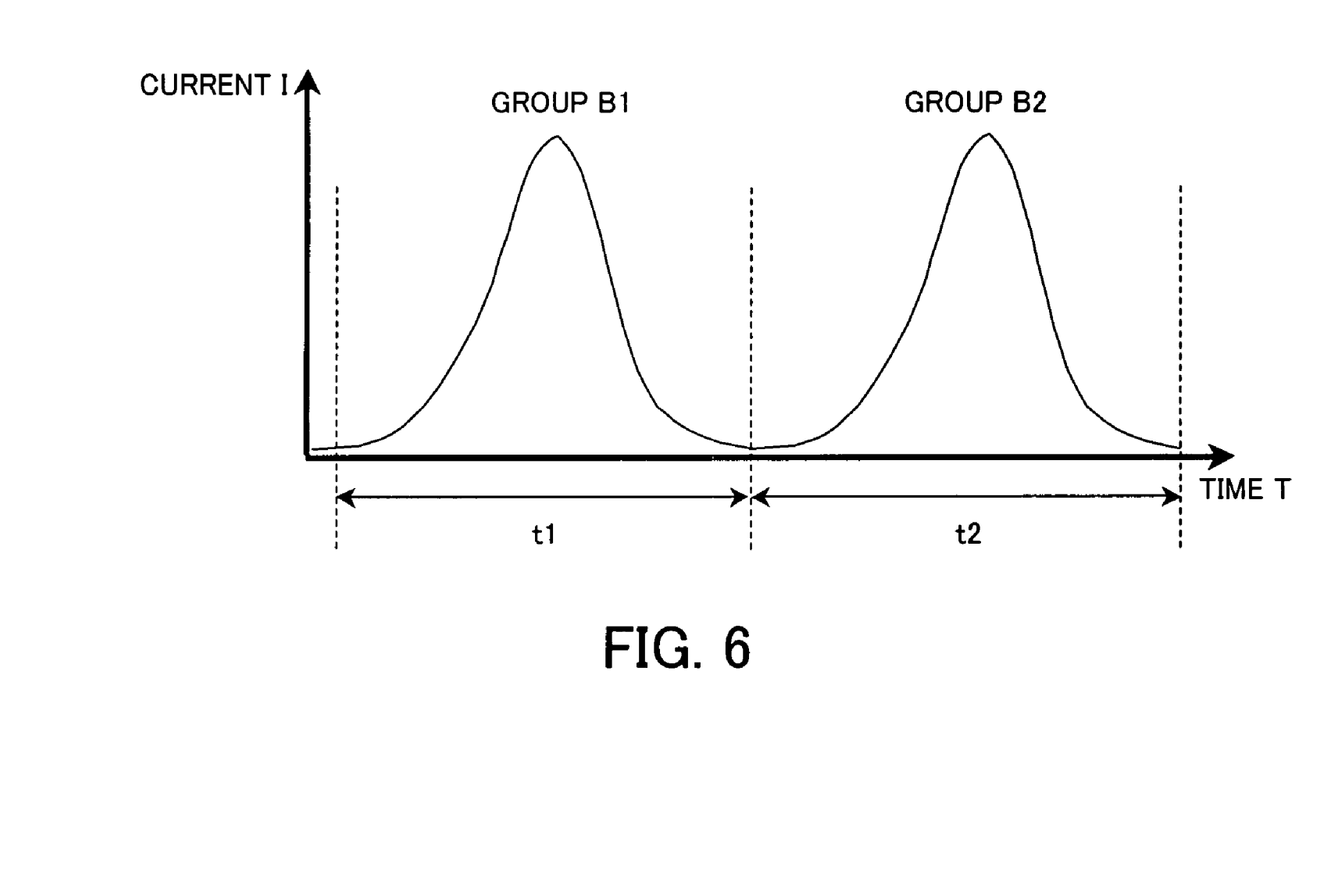
FIG. 6 shows an example of a reset timing of a semiconductor device.

Next, the reset timing will be described. FIG. 6 shows an example of the reset timing of the semiconductor device. The figure shows the current values during reset of the groups B1 and B2 formed by grouping the flip-flops. The computer 10 inserts the buffer between the reset lines of the groups B1 and B2 such that the reset timing is different in each group. It is assumed that the time t1 in the figure is the maximum current change time of the flip-flops within the group B1 and the time t2 in the figure is the maximum current change time of the flip-flops within the group B2.

The reset timing of the group B2 must be determined such that the group B2 is reset at least after the maximum current change time t1 of the group B1. This is because, when the maximum current change times t1 and t2 of the groups B1 and B2 overlap, a current resulting from adding currents flowing through the groups B1 and B2 flows through the semiconductor device during reset. Accordingly, on the basis of the maximum current change times t1 and t2 of respective groups B1 and B2, the delay time of the buffer must be determined such that the maximum current change times of the groups B1 and B2 flowing during reset do not overlap as shown in FIG. 6.

Incidentally, the current change time is stored in the FF library 12 as described in FIG. 5. With reference to the FF library 12 on the basis of the flip-flop name, the computer 10 obtains the maximum current change time within each of the groups. Furthermore, the computer 10 determines the delay time of the buffer such that the current change times obtained in the respective groups do not overlap.

As described above, this design method comprises the following steps. First, the computer 10 groups the flip-flops. Then, the computer 10 inserts the buffers between the reset lines such that the reset timing of the flip-flops is different in each group. As a result, a large current flowing during reset is reduced to suppress AC noise so that the semiconductor device can be prevented from being broken.

In the above description, flip-flops are used as the circuits to be grouped. Further, other elements or circuits that store data may be used. Namely, elements or circuits requiring the reset may be grouped.

The method for designing a semiconductor device according to the present invention comprises the steps of: grouping arranged memory circuits by the use of a computer; and inserting by the use of the computer a delay circuit between reset lines such that reset timing of the memory circuits is different in each group of the grouped memory circuits. As a result, a large current flowing during reset is controlled to suppress AC noise so that the semiconductor device can be prevented from being broken.

The semiconductor device according to the present invention has a structure that the memory circuits are reset at the timing different in each group during reset. As a result, a large current flowing during reset is controlled to suppress AC noise so that the semiconductor device can be prevented from being broken.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method for designing a semiconductor device having a plurality of memory circuits, the method comprising:
    calculating an allowable power supply current to flow through a power supply during reset, such that an AC noise produced on wiring of the power supply due to inductance and resistance thereof will fall within a maximum voltage rating that the semiconductor device withstands without damage;
    arranging memory circuits into groups, a total reset current of memory circuits belonging to a group being less than the calculated allowable power supply current; and
    inserting a delay circuit between reset lines such that different groups of the memory circuits will be reset at different times.

2. The method for designing a semiconductor device according to claim 1, wherein:
    a maximum current that flows during reset is defined for each of the memory circuits; and
    the reset current is calculated based on the maximum current value of each memory circuit.

3. The method for designing a semiconductor device according to claim 2, wherein the total reset current of memory circuits belonging to a group is calculated by adding up the maximum current of the memory circuits belonging to that group.

4. The method for designing a semiconductor device according to claim 3, wherein when the total reset current of memory circuits belonging to a group is less than the allowable power supply current, said arranging adds a new memory circuit to the group, and compares a new total reset current including the maximum current of the added memory circuit with the allowable power supply current.

5. The method for designing a semiconductor device according to claim 4, wherein when the new total reset current is greater than the allowable power supply current, said arranging deletes the last added memory circuit from the group.

6. The method for designing a semiconductor device according to claim 3, wherein:
    when the total reset current of memory circuits belonging to a group is less than the allowable power supply current, said arranging adds a new memory circuit to the group, and compares a new total reset current including the maximum current of the added memory circuit with the allowable power supply current; and
    when the new total reset current is greater than the allowable power supply current, said arranging deletes the last added memory circuit from the group and forms a new group with deleted memory circuit.

7. The method for designing a semiconductor device according to claim 1, wherein the allowable power supply current is calculated from layout data of a power supply network.

8. The method for designing a semiconductor device according to claim 1, wherein each group includes at least one memory circuit.

9. The method for designing a semiconductor device according to claim 1, wherein said arranging refers to names and arrangement coordinates provided in a layout data of the memory circuits in determining which memory circuits should form a group.

10. The method for designing a semiconductor device according to claim 1, wherein the memory circuits are flip-flops.

11. The method for designing a semiconductor device according to claim 1,
    wherein the delay circuit inserted between the reset lines propagates a reset signal from one group of memory circuits to another group of memory circuits such that different groups of the memory circuits will be reset at different times, the delay circuit giving the reset signal a time delay corresponding to a current change time during which a current flowing through said one group of memory circuits changes upon reset.

12. The method for designing a semiconductor device according to claim 11, wherein:
    the current change time is defined for each of the memory circuits; and
    the time delay corresponds to a maximum current change time of the memory circuits belonging to said one group.

13. The method for designing a semiconductor device according to claim 11, wherein the delay circuit gives a time delay that is long enough for said another group of memory circuits to be reset after the change in the current flowing through said one group of memory circuits is finished.

14. An apparatus for designing a semiconductor device having a plurality of memory circuits, the apparatus comprising:
    a calculating unit for calculating an allowable power supply current that is allowed to flow through a power supply wiring during reset, such that an AC noise produced on the power supply wiring due to inductance and resistance thereof and a current flowing therethrough will fall within a maximum voltage rating that the semiconductor device withstands without damage;
    a grouping unit for arranging memory circuits into groups such that a total reset current of memory circuits belonging to a group being less than the allowable power supply current; and
    a delay circuit inserting unit for inserting a delay circuit between reset lines such that different groups of the memory circuits will be reset at different times.

15. A semiconductor device comprising:
    a plurality of groups of memory circuits, wherein a total reset current of memory circuits belonging to a group is less than an allowable power supply current that is allowed to flow through a power supply wiring during reset, and wherein the allowable power supply current is calculated such that an AC noise produced on the power supply wiring due to inductance and resistance thereof and a current flowing therethrough will fall within a maximum voltage rating that the semiconductor device withstands without damage;

a reset line provided for each group of memory circuits to reset the memory circuits in a group simultaneously; and a delay circuit inserted between the reset lines to propagate a reset signal form one group of memory circuits to another group of memory circuits.

* * * * *